(12) United States Patent
Franzaroli

(10) Patent No.: US 10,087,006 B2
(45) Date of Patent: Oct. 2, 2018

(54) APPARATUS FOR CONVEYING ARTICLES TOWARDS CORRESPONDING POINTS OF USE

(71) Applicant: PULSAR S.R.L., Castel Maggiore (Bologna) (IT)

(72) Inventor: Massimo Franzaroli, Castel Maggiore (IT)

(73) Assignee: PULSAR S.R.L., Castel Maggiore (Bologna) (IT)

( * ) Notice: Subject to any disclaimer, the term of this patent is extended or adjusted under 35 U.S.C. 154(b) by 0 days.

(21) Appl. No.: 15/100,396

(22) PCT Filed: Mar. 31, 2014

(86) PCT No.: PCT/IB2014/060327
§ 371 (c)(1),
(2) Date: May 31, 2016

(87) PCT Pub. No.: WO2015/079326
PCT Pub. Date: Jun. 4, 2015

(65) Prior Publication Data
US 2016/0297615 A1    Oct. 13, 2016

(30) Foreign Application Priority Data
Nov. 29, 2013 (IT) .............................. BO2013A0664

(51) Int. Cl.
*B65G 37/00* (2006.01)
*B65G 15/50* (2006.01)
(Continued)

(52) U.S. Cl.
CPC .............. *B65G 15/50* (2013.01); *B65B 11/00* (2013.01); *B65B 25/146* (2013.01); *B65B 35/44* (2013.01);
(Continued)

(58) Field of Classification Search
CPC ........ B65G 15/50; B65G 31/10; B65G 47/31; B65B 11/00; B65B 25/146; B65B 35/44; B65B 35/54; B65B 63/00; B65B 65/006
(Continued)

(56) References Cited

U.S. PATENT DOCUMENTS

| | | | | |
|---|---|---|---|---|
| 4,265,361 A | * | 5/1981 | Schroeder | B26D 3/16 198/626.1 |
| 4,424,966 A | * | 1/1984 | Chandhoke | B65G 21/14 271/182 |

(Continued)

FOREIGN PATENT DOCUMENTS

| | | |
|---|---|---|
| EP | 0 150 889 | 8/1985 |
| GB | 2 137 918 | 10/1984 |

(Continued)

OTHER PUBLICATIONS

International Search Report dated Aug. 18, 2014, corresponding to PCT/IB2014/060327.

*Primary Examiner* — William Ray Harp
(74) *Attorney, Agent, or Firm* — Young & Thompson

(57) ABSTRACT

Described is an apparatus for conveying articles towards corresponding points of use and preferably located between an upstream machine for making rolls, in particular in the form of a saw machine for cutting rolls from a respective tube or elongate log, and at least corresponding first and second conveyers moving the articles towards corresponding downstream points of use or packaging machines. The apparatus includes a supporting frame for a conveyor which receives the articles from the machine which makes the articles and for a movable conveyor passing the articles respectively at least to first or second conveyors for conveying them downstream. The apparatus has a conveyor receiving the articles and includes a transporting unit engaging the articles at an off-center lower zone laterally opposite (Continued)

the lateral engagement zone where the articles are engaged by the lateral supporting conveyor of the upstream machine which makes the articles, or saw machine.

37 Claims, 5 Drawing Sheets

(51) Int. Cl.
| | |
|---|---|
| B65B 25/14 | (2006.01) |
| B65B 35/44 | (2006.01) |
| B65B 35/54 | (2006.01) |
| B65B 63/00 | (2006.01) |
| B65B 11/00 | (2006.01) |
| B65B 65/00 | (2006.01) |
| B65G 21/10 | (2006.01) |
| B65G 47/31 | (2006.01) |

(52) U.S. Cl.
CPC .............. *B65B 35/54* (2013.01); *B65B 63/00* (2013.01); *B65B 65/006* (2013.01); *B65G 21/10* (2013.01); *B65G 47/31* (2013.01)

(58) Field of Classification Search
USPC .................. 198/579, 369.1, 369.2, 435, 436
See application file for complete search history.

(56) References Cited

U.S. PATENT DOCUMENTS

| | | | | |
|---|---|---|---|---|
| 4,462,287 A | * | 7/1984 | Weis .................. | B26D 3/16 83/104 |
| 5,475,917 A | * | 12/1995 | Biagiotti .................. | B26D 3/16 198/428 |
| 6,619,017 B2 | * | 9/2003 | Franzaroli ............. | B65B 25/146 198/419.2 |
| 6,868,958 B2 | * | 3/2005 | Betti ........................ | B26D 3/16 198/418.7 |
| 6,915,550 B2 | * | 7/2005 | Betti ........................ | B26D 3/16 198/428 |
| 6,994,206 B2 | * | 2/2006 | Adamski ................. | B65B 35/44 198/570 |
| 7,014,032 B2 | * | 3/2006 | Franzaroli ............. | B65G 47/24 198/376 |
| 7,946,205 B2 | * | 5/2011 | Benvenuti ................ | B26D 5/00 83/102 |
| 8,167,136 B2 | * | 5/2012 | Betti ........................ | B26D 7/18 198/588 |
| 8,678,170 B2 | * | 3/2014 | Carrara ................. | B65G 47/647 198/352 |
| 8,689,966 B2 | * | 4/2014 | Gambini .................. | B26D 7/18 198/369.7 |
| 2003/0167887 A1 | | 9/2003 | Butterworth | |
| 2006/0124435 A1 | * | 6/2006 | Benvenuti ................ | B26D 5/00 198/626.1 |
| 2011/0180371 A1 | * | 7/2011 | Carrara ................ | B65G 47/647 198/435 |

FOREIGN PATENT DOCUMENTS

| | | |
|---|---|---|
| WO | 00/05138 | 2/2000 |
| WO | 03/011723 | 2/2003 |
| WO | 2008/117150 | 10/2008 |

\* cited by examiner

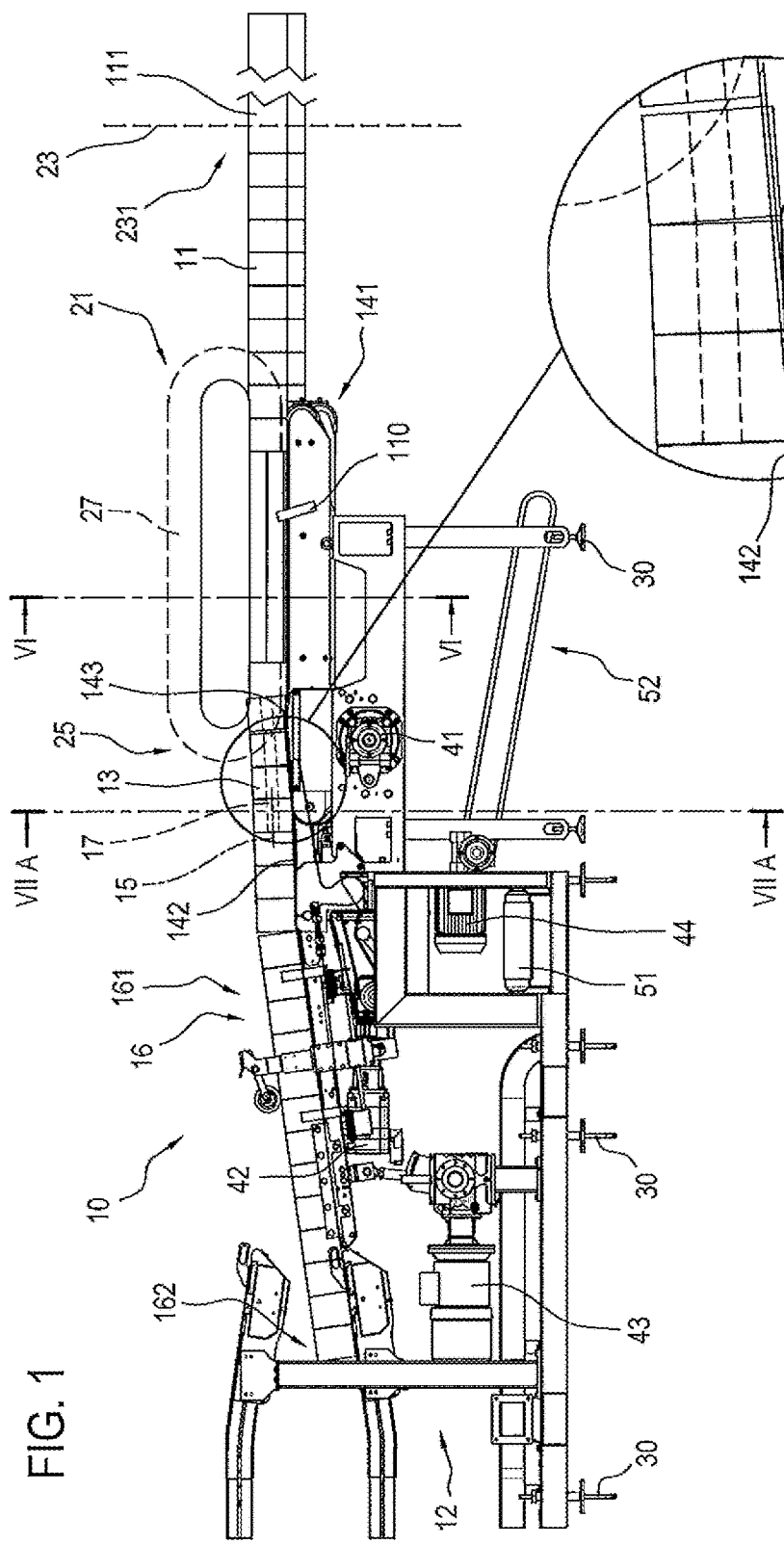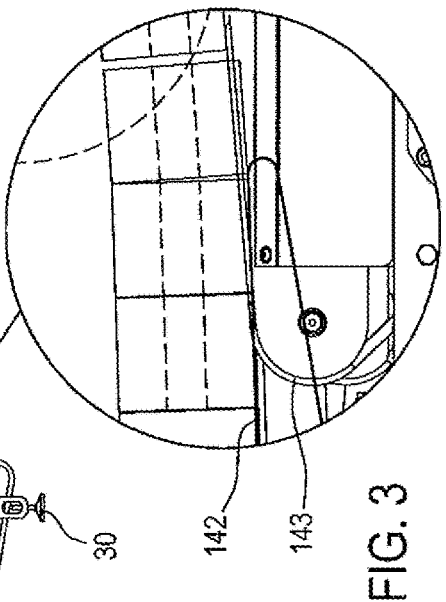

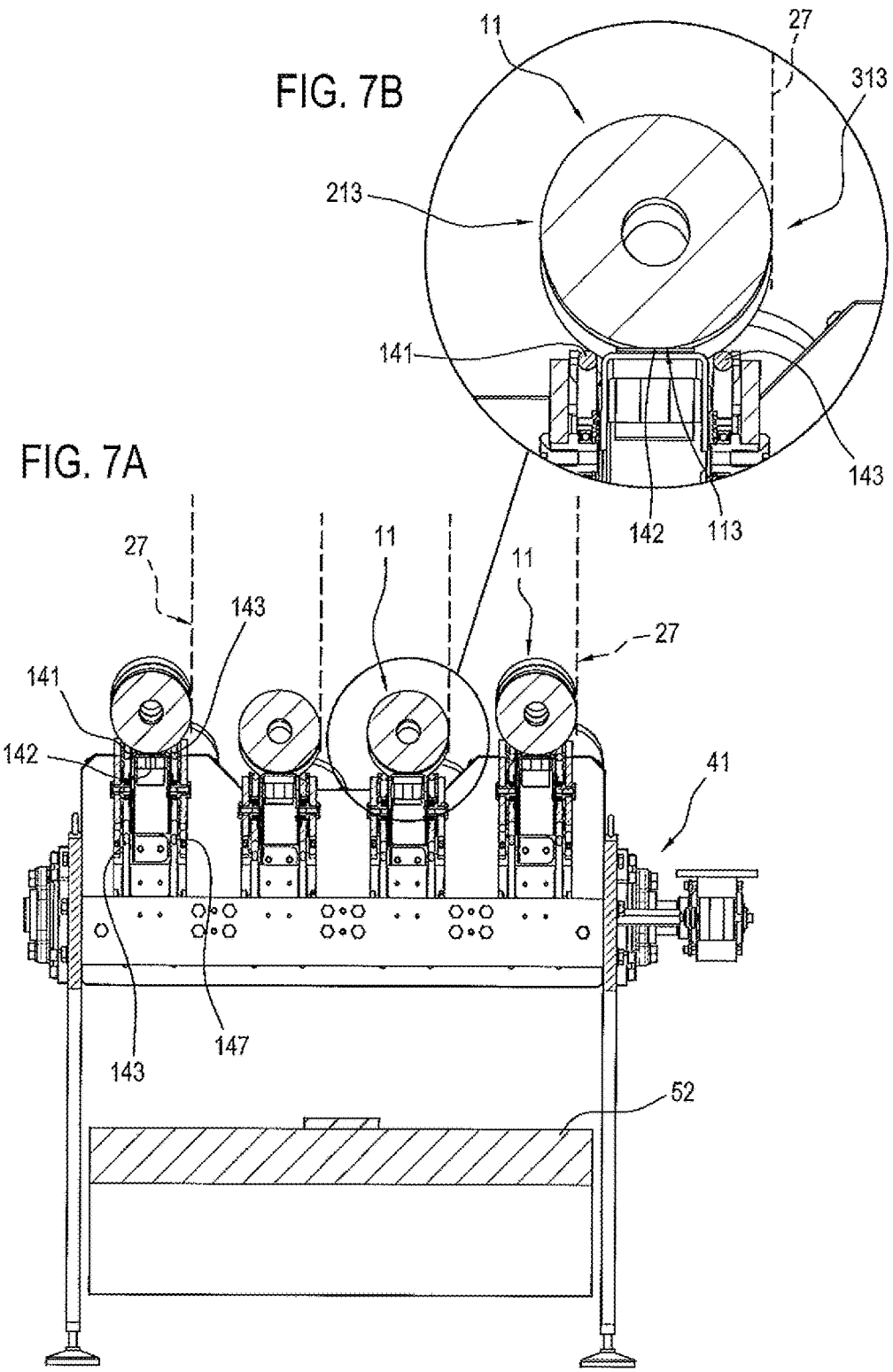

APPARATUS FOR CONVEYING ARTICLES TOWARDS CORRESPONDING POINTS OF USE

TECHNICAL FIELD

This invention relates to an apparatus for conveying articles towards corresponding points of use.

In particular, the articles are rolls, preferably rolls of paper, especially of toilet paper or of paper towels.

More specifically, the apparatus is located between an upstream machine for making the articles, in particular in the form of a saw machine for cutting the articles especially from a respective log or elongate tube, and at least corresponding first and second means for conveying the articles towards corresponding downstream points of use, in particular in the form of packaging machines, such as packing machines by which the articles are packed in corresponding wrappers or wrapping film.

BACKGROUND ART

Known to the prior art are apparatuses for conveying articles, in particular in the form of rolls of toilet paper or of paper towels, and which are located between a saw machine for cutting the articles from respective logs or elongate tubes, and at least corresponding first and second means for conveying the articles towards corresponding packaging machines by which the articles are packed in corresponding wrappers.

More specifically, these prior art apparatuses are designed to receive the articles from the log saw machine upstream, in particular from respective conveyor means of the log saw machine, which pick the rolls up by suction and, holding them from above, feed them towards the outfeed of the log saw machine.

In prior art installations, the conveying apparatus which switches or diverts the flow of rolls towards the respective packing machines uses, to perform the switching action movement, the space between the articles cut from respective logs, or elongate tubes, fed one after the other in sequence.

Known conveying and switching apparatuses comprise a supporting frame, conveyor means which receive the articles, or rolls, from the machine upstream which makes the articles, and movable conveyor means which are adapted to pass the articles, or rolls, respectively at least to first means or second means for conveying the articles downstream, towards corresponding points of use.

Prior art apparatuses downstream of the log saw receive the rolls cut from the logs from the suction feed means of the log saw.

The roll suction feed means of the log saw machine suffer from several problems relating to their effectiveness in holding the products and to the possibility of damaging or dirtying the articles or rolls when product feed is momentarily interrupted on account of a problem along the line and the rolls remain stationary for an excessive length of time on the selfsame suction outfeed means of the log saw machine.

To overcome these problems, feed means for feeding rolls out of the log saw machine have been developed which are adapted to engage and laterally support the articles and which act in conjunction with a respective off-centre strap by which the articles or cylindrical rolls are engaged on the opposite side of them.

One problem with these prior art apparatuses relates to the handling of the articles or rolls in their passage from the log saw machine upstream to the conveying apparatus downstream of the log saw machine, during which the rolls are dropped onto the conveying apparatus by the suction conveyor of the log saw machine.

In effect, the conveyors downstream of the log saw machine can receive the articles only supported centrally. As a result, the rolls are passed on to the conveying or switching apparatus downstream in a non-optimal manner, with the risk of the rolls tipping over or being positioned transversely, thereby holding up the feed system and leading to machine shutdowns and consequent production losses.

Moreover, the trade also feels the need for conveying apparatuses which are simple in construction and inexpensive.

Another need felt by the field is that of achieving maximum operating integration between the machines upstream by which the articles are made and the conveying or switching means by which the articles are carried to the points of use downstream.

DISCLOSURE OF THE INVENTION

This invention therefore proposes a new solution as an alternative to the solutions known up to now and, more specifically, proposes to overcome one or more of the above mentioned drawbacks or problems and/or to meet one or more of the needs felt by the trade and which, in particular, may be inferred from the above.

It is accordingly provided an apparatus for conveying articles towards corresponding points of use; the articles being in particular defined by paper articles and being especially in the form of rolls, preferably rolls of toilet paper or of paper towels; the apparatus being preferably located between an upstream machine for making the articles, in particular in the form of a saw machine for cutting the articles, especially from a respective elongate element or log, and at least corresponding first and second means for conveying the articles towards corresponding downstream points of use, in particular in the form of packaging machines, such as packing machines by which the articles are packed in corresponding wrappers, preferably made of plastic film; the apparatus being, in particular, adapted to receive the articles from the upstream machine in particular from respective end conveyor means thereof which are adapted to advance the articles while supporting or engaging them on a respective lateral flank; the apparatus comprises a supporting frame for conveyor means which receive the articles from the upstream machine which makes the articles and for movable conveyor means which are adapted to pass the articles respectively at least to first means or second means for conveying them downstream; characterized in that the conveyor means for receiving the articles comprise transporting means which are adapted to engage the articles at an off-centre lower zone which is laterally opposite the lateral engagement zone where the articles are engaged by the lateral supporting conveyor means of the upstream machine which makes the articles.

That way, the conveyor means downstream of the machine by which the articles themselves are made can receive the articles in an optimum manner without causing problems of any kind in passing on the articles.

BRIEF DESCRIPTION OF THE DRAWINGS

This and other innovative aspects of the apparatus are set out in the appended claims and its technical features and advantages are apparent from the detailed description which follows of a preferred, advantageous embodiment of it which must, however, be considered purely as a non-limiting example of the invention, the description being made with reference to the accompanying drawings, in which:

FIG. 1 shows a longitudinal view of the preferred embodiment of the apparatus according to the invention, located immediately downstream of the machine by which the articles are made;

FIG. 3 is an enlarged detail from FIG. 1, showing in particular the conveyor means by which the articles are received from the machine upstream;

FIG. 7A is a transversal cross section through line VIIA-VIIA of FIG. 1, showing the preferred embodiment of the apparatus;

FIG. 7B shows an enlarged detail from FIG. 7A.

DETAILED DESCRIPTION OF PREFERRED EMBODIMENTS OF THE INVENTION

Figure 2:
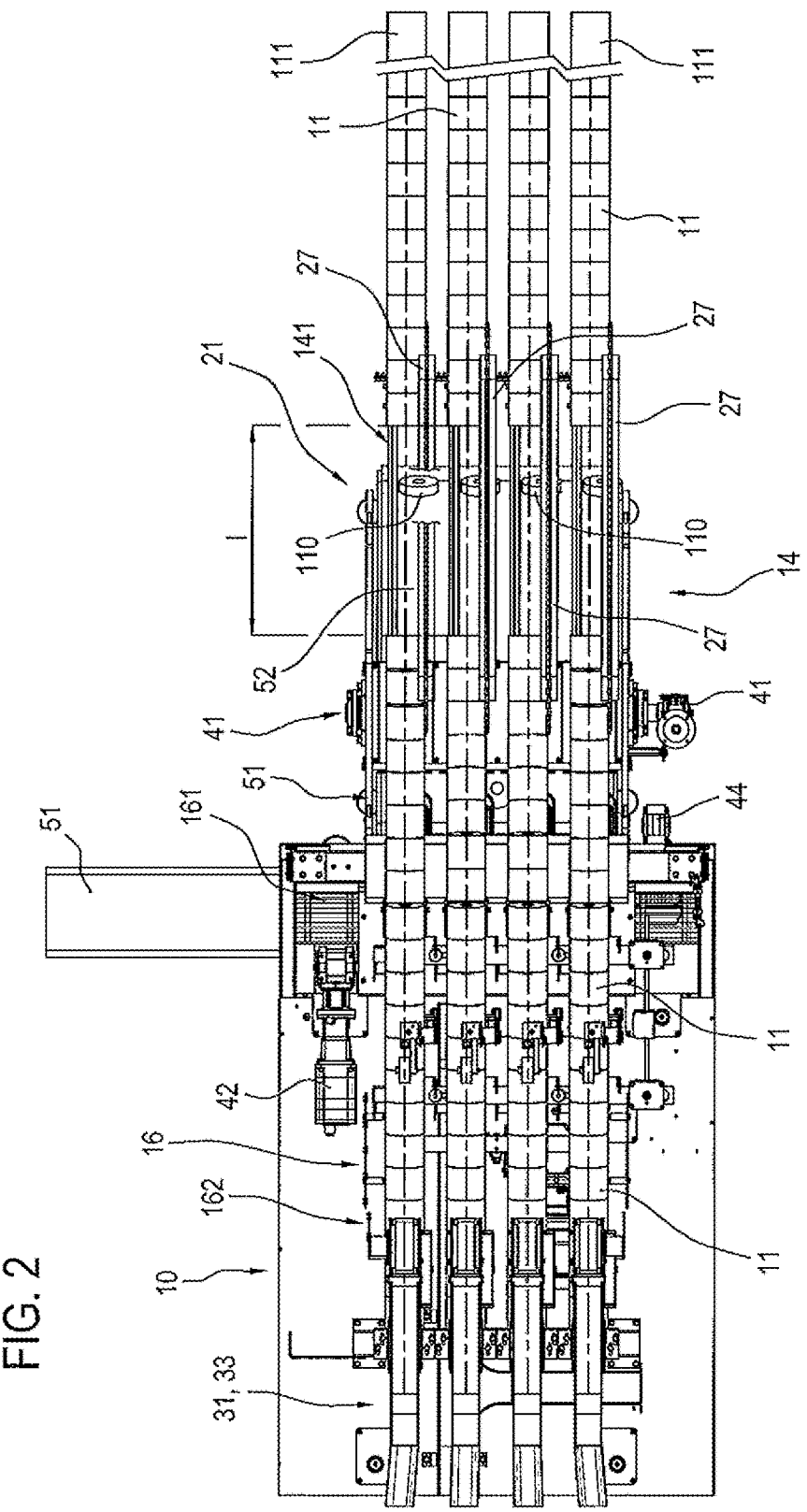
FIG. 2 shows a top plan view of the apparatus of the invention for conveying the articles.
Figure 4:
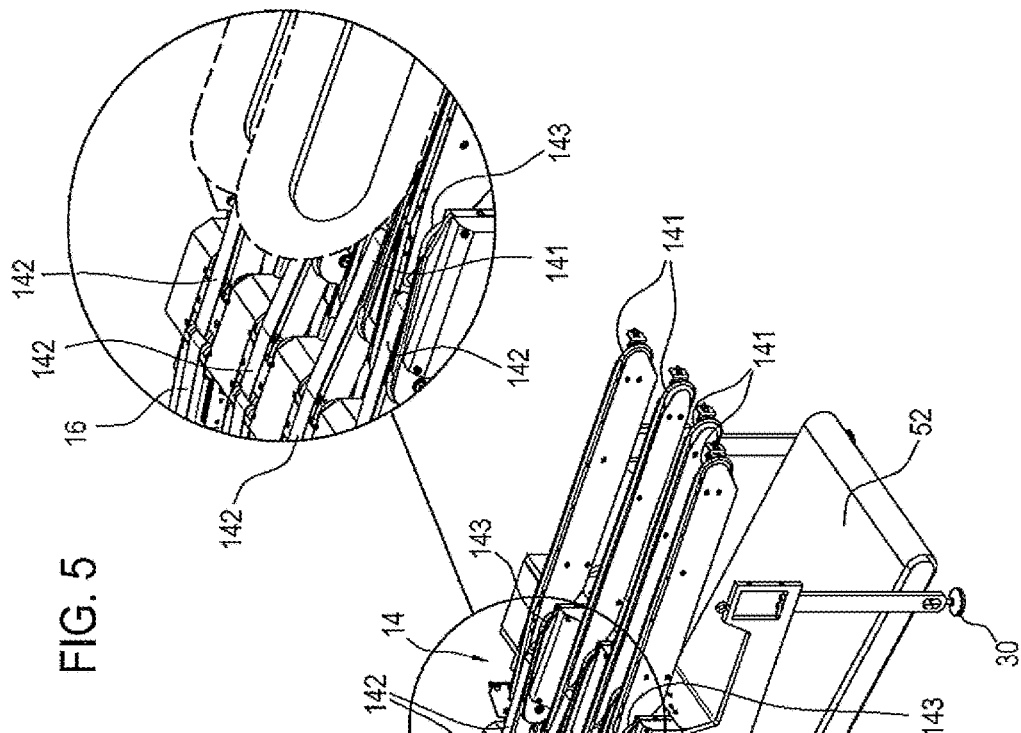
FIG. 4 is a perspective view of the preferred embodiment of the apparatus according to this invention.
Figure 5:
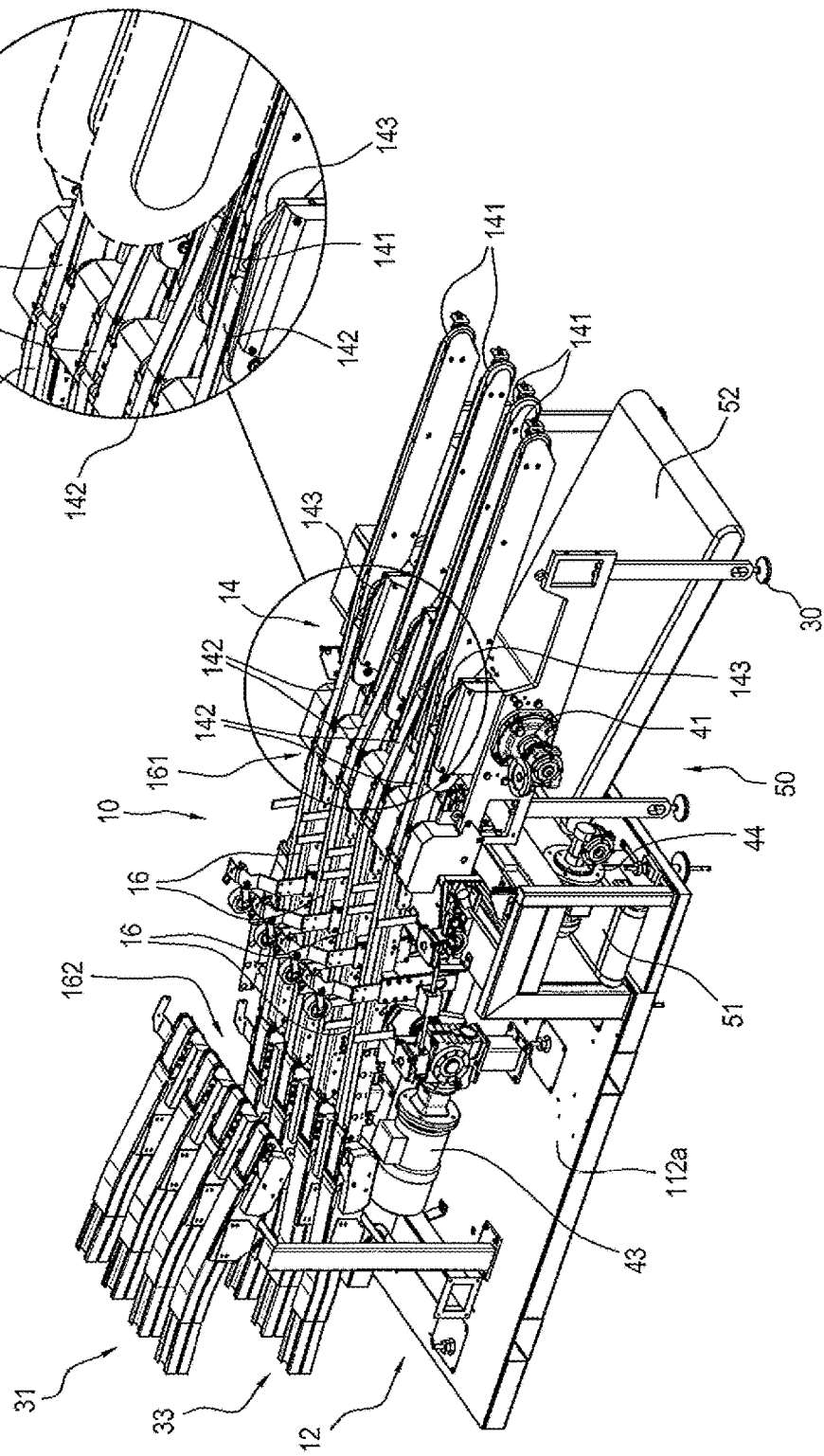
FIG. 5 is an enlarged detail from FIG. 4, showing in particular the conveyor means by which the articles are received from the machine upstream.

FIG. 1 shows a preferred embodiment 10 of an apparatus for conveying, or switching, articles 11 towards corresponding points of use.

Preferably, the articles 11 are of paper material, especially in the form of rolls, preferably rolls of toilet paper or of paper towels.

More specifically, the articles 11 are obtained from corresponding elongate logs of the same paper material, which are equal in diameter to the articles obtained therefrom.

The apparatus 10 is preferably located between an upstream machine for making the articles, in particular in the form of a log saw machine 21 designed to cut the articles 11 in sequence from respective elongate elements, or logs, 111 and corresponding means for conveying the articles towards corresponding points of use downstream.

More specifically, the upstream machine for making the articles comprises a cutting blade 23, illustrated schematically in FIG. 1, which is movable from a cutting position where it cuts the articles and a position where it allows the respective article or roll cut off from a log or elongate element to pass freely downstream.

More specifically, the cutting blade 23 is designed to cut a plurality of logs 111 positioned parallel to each other and advancing on respective parallel feed lines. More specifically, in this case, as illustrated, the cutting blade 23 is adapted to simultaneously cut four logs 111 positioned parallel to each other on the log saw machine.

The log saw machine, in particular for each respective feed line, is designed to cut respective groups or trains of articles 11 from respective logs 111, which are advanced in sequence with each other and in such a way that between the group or train of articles cut from one log and the group or train of articles cut from the next log there is a longitudinal distance or spacing "l".

As will become clearer as this description continues, the longitudinal distance or spacing between groups of products obtained from logs fed in sequence with each other allows the apparatus of the invention to switch or divert the articles, if necessary, towards different points or use or packaging machines downstream.

Advantageously, as will become clearer as this description continues, this longitudinal distance or spacing can be modified, in particular increased, by the apparatus of the invention, especially when the longitudinal spacing between groups of articles as they feed out of the log saw machine upstream is not large enough to allow the switch towards corresponding points of use to be made safely, or to avoid having to slow down the entire system of feeding the products or articles downstream in order to make the switching movement.

Figure 6:
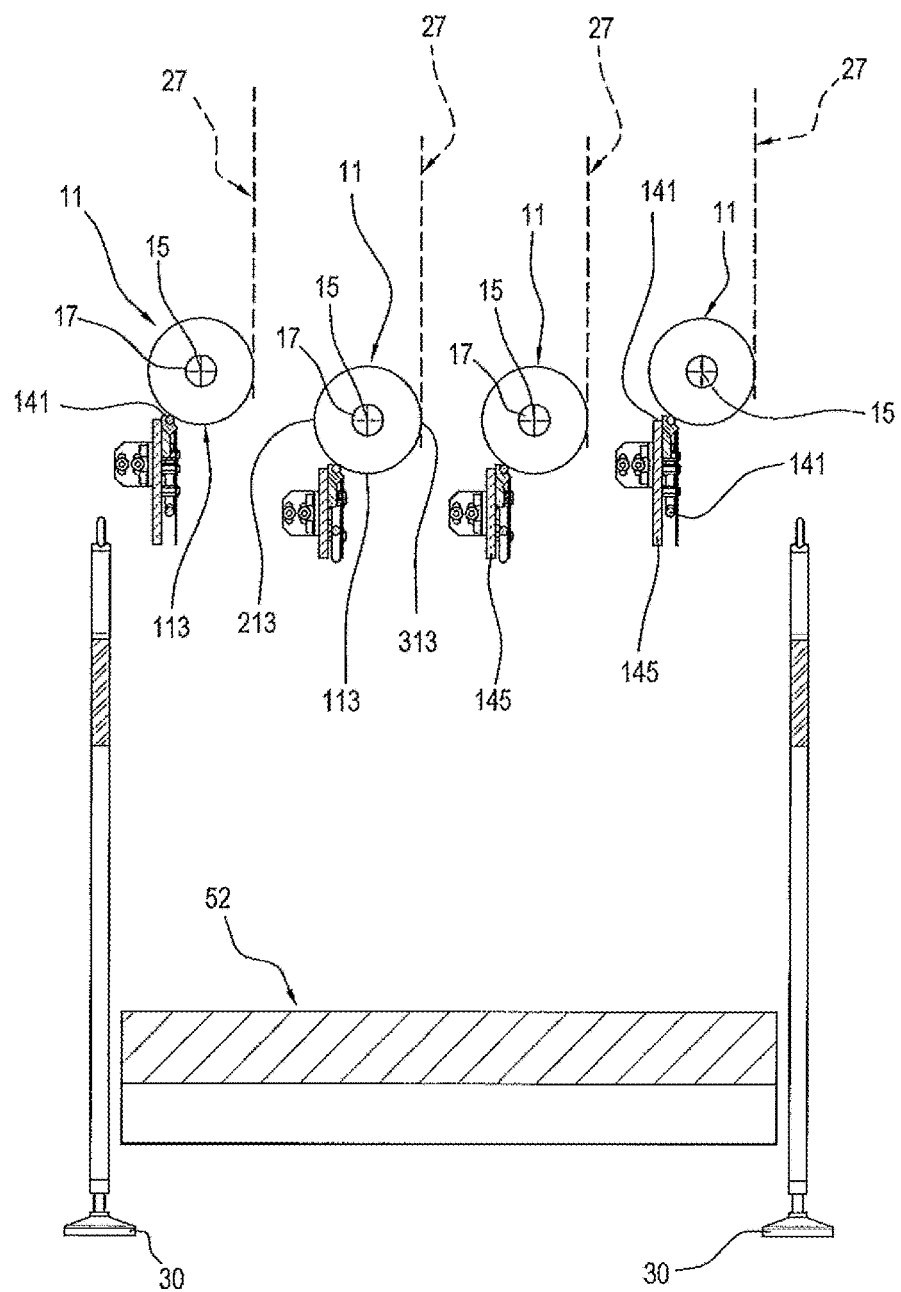
FIG. 6 is a transversal cross section through line VI-VI of FIG. 1, showing the preferred embodiment of the apparatus.

The upstream machine 21 by which the articles are made comprises, in particular downstream of the log saw blade 23, respective conveyor means by which the articles are pushed towards the outfeed 25 of the log saw machine 21 and which have respective feed means 27 which are designed solely to laterally engage and support the articles 11, that is to say, to engage the articles solely by one flank, as may be clearly inferred from FIG. 6.

More specifically, the conveyor means 27 comprise an elongate endless rotating element, in particular in the form of a belt, in particular extending in a vertical plane, from which there extend corresponding paddles for laterally engaging the articles 11 to be fed out of the log saw machine 21. The paddles for laterally engaging the articles 11 are not illustrated in detail in the accompanying drawings.

The endless conveyor means 27 for laterally engaging the articles feeding out of the log saw machine 21 have respective ends which are spaced from each other, in particular to an extent such as to allow dropping, that is, such as not to engage, the respective waste or offcut ends of the logs, labelled 110 in FIG. 2.

In practice, the lateral engagement paddles 27 extend on the respective belt or elongate element which mounts and moves them for a respective stretch, corresponding to the length of the train, or plurality, of articles to be conveyed, and in particular corresponding to the number of articles obtained from a respective log or elongate element 111.

More specifically, the log saw machine 21 upstream cuts the articles in sequence from respective logs or elongate elements fed sequentially to the cutting zone 231.

As mentioned above, the log saw machine 21 preferably cuts, simultaneously, a plurality of logs, or elongate elements, which are fed side by side with, or parallel to, each other and which are progressively cut by a single cutting blade 23.

Also, the articles 11 obtained from respective logs, or elongate elements, 111 are longitudinally close, or juxtaposed, to each other. Thus, it is more difficult for the rolls to be tipped over or positioned transversely to the feed direction as they continue moving along the conveyor.

Advantageously, as will become clearer as this description continues, the apparatus of the invention diverts or switches the flow of articles 11 which it has received from the log saw machine 21 upstream towards respective first and second conveyor means downstream, making advantageous use of the longitudinal distance or spacing "l" between sequentially fed trains of articles, each train corresponding to the length of a respective log, or longitudinal elongate element 111.

More specifically, the conveyor means downstream comprise at least first and second means for conveying the articles 11 towards corresponding points of use downstream.

More specifically, in the installation where the apparatus of the invention is located, the points of use may be corresponding packaging machines, such as machines by which the articles 11 are packed in corresponding wrappers, preferably of plastic film, wrapped around one or more of the articles to make a respective pack.

Advantageously, the apparatus of the invention comprises first and second conveyor means 31, 33, mounted on the frame 12, for carrying the articles 11 towards the conveying lines towards corresponding points of use downstream.

As illustrated, the conveyor means 31, 33 are located above one another. Also, as illustrated, the conveyor means 31, 33 are in the form of corresponding transporting belts and comprise a plurality of lines, or parallel belts, in particular four transporting belts for each conveying level 31, 33.

As may be inferred from FIG. 6, the respective rolls 11, that is, the respective log, or elongate element, from which the rolls are obtained, have a cylindrical, or substantially cylindrical, outside surface 13 and a tubular inside core 15, preferably of paper material, in particular, stiff, semi-stiff or stiffened material, especially paperboard.

Each roll 11, or the respective log or elongate element, consists of a continuous band of paper material 13 wound onto the stiff core 15 to form a plurality of superposed layers, the continuous band being preferably of tissue paper, in particular toilet paper or paper towelling.

As may be well inferred from FIG. 1, the articles or rolls 11 have a respective axis 17 which is directed longitudinally or along the direction of article feed.

As may be well inferred from FIG. 6, the articles or rolls 11 have an outside surface 13 which defines a lower end edge, or point 113, and opposite lateral end edges, or points, 213, 313.

Advantageously, the apparatus 10 is designed to receive the articles 11 from the log saw machine 21, in particular from the end conveyor means 27 thereof, which are adapted to feed the articles while supporting them only laterally, that is, receiving the articles 11 in lateral abutment, in particular, as illustrated in FIG. 6, by engaging the lateral flank 313 thereof.

As already mentioned, the means 27 for laterally engaging and feeding the articles on the log saw machine 21 do not have paddles for laterally engaging the articles along respective stretches of the rotating elongate element or belt which mounts them, at the offcut end portions 110 of the logs or elongate elements, so as to allow these offcut end portions to be dropped.

Advantageously, the apparatus 10 comprises a mounting frame 12, which, as illustrated in the accompanying drawings, comprises a plurality of uprights connected by respective crosspieces and a wide base 112a, preferably defining means for containing respective electric and/or pneumatic power supplies.

The frame 12 defines respective lateral flanks which may, if necessary, be closed by respective openable panels or doors, and respective longitudinal ends which are open to allow the respective conveyor means to extend into and out of the frame 12 respectively towards the log saw machine 21 upstream and the conveyor means directed to the points of use downstream.

As illustrated, the frame 12 is rested on the floor on corresponding feet 30. Mounted on the frame 12 of the apparatus 10 are conveyor means 14 which are located longitudinally upstream, that is, directed towards the log saw machine upstream, and which are designed to receive the articles from the selfsame log saw machine 21 upstream.

These conveyor means for receiving the articles are designed to pass the articles to movable conveyor means 16, which are located longitudinally downstream and which are designed to pass the articles 11 respectively at least to first means 31 and second means 33 for conveying the articles towards corresponding points of use.

The downstream conveyor means 31, 33 of the installation where the apparatus of the invention is located, are preferably in the form of respective conveyor belts, which may be of the articulated chain type, that is to say, made up of a plurality of plastic links which are articulated to each other.

More specifically, the movable conveyor means 16 are designed to move between a first position, in particular a raised position, for passing the articles to the first conveyor means 31, where the free, or movable, end 162 of the conveyor means 16 is at the article receiving end of the first conveyor means 31, and a second position, in particular a lowered position, illustrated in FIG. 1, for passing the articles to the second conveyor means 33, where the free, or movable, end 162 of the conveyor means 16 is at the article receiving end of the second conveyor means 33. More specifically, as already mentioned, the downstream conveyors 31, 33 are located at different heights and are positioned vertically above one another, being in particular vertically aligned with each other.

The downstream conveyors 31, 33, too, have a plurality of conveying lines, in particular equal in number to the feed lines for feeding the products or articles out of the log saw machine 21 upstream.

It will be understood, however, that the apparatus of the invention might be configured in such a way as to transfer the articles to a plurality of conveyors downstream, however configured or positioned, and greater in number than the two conveying lines 31, 33 described herein.

As illustrated, the movable conveyor means 16 for diverting the flow articles have a respective upstream end 161, in particular fixed, to allow the articles to be gripped by the conveyor means 14 for receiving the articles and are movable, in particular rotatable about a respective transversal axis, in such a way as to selectively move, in particular vertically, the free downstream end 162 between the first and second downstream conveyor means 31, 33.

The conveying and switching apparatus 10 also comprises a plurality of conveyor lines running side by side, in particular parallel to each other.

More specifically, as illustrated in the drawings, the conveying and switching apparatus 10 comprises four conveyor lines running side by side.

Thus, the receiving conveyor means 14 comprise a plurality of conveyor lines running side by side, in particular parallel to each other, and/or the movable conveyor means 16 comprise a plurality of conveyor lines running side by side, in particular parallel to each other, and more specifically, corresponding to the conveyor lines of the conveyor means 14.

Advantageously, the conveyor means 14 for receiving the articles 11 of the apparatus 10 comprise transporting means 141 which are adapted to engage the articles at an off-centre lower zone which is laterally opposite the lateral engagement zone 313 where the articles are engaged by the lateral supporting conveyor means 27 of the upstream log saw machine 21 which makes the articles.

More specifically, the transporting means 141 for engaging the articles 11 at an off-centre lower and laterally opposite zone extend side by side and parallel to the lateral supporting conveyor means 27 of the upstream log saw machine 21 which makes the articles, at least for an end stretch thereof and, in any case, as may be inferred from FIG. 1, substantially for the full longitudinal length thereof.

More specifically, the transporting and off-centre supporting means 141 of the receiving means 14 of the apparatus 10 extend parallel to the lateral supporting conveyor means 27 of the upstream log saw machine 21 which makes the articles.

As illustrated, further advantageously, the article receiving conveyor means 14 of the apparatus of the invention comprise transporting means 142 for centrally engaging the articles and which receive the selfsame articles 11 resting thereon.

The transporting means 142 for centrally engaging the articles 11 are in the form of a transporting belt on which the articles 11 are rested with their lower central edge 113.

More specifically, the transporting means 142 which engage the lower central edge of the articles 11 extend alongside, and preferably parallel to, the transporting and off-centre opposite engagement means 141.

Advantageously, the conveyor means 14 for receiving the articles 11 also comprise transporting means 143, which are adapted to engage the articles 11 at an off-centre lower zone on the same side or flank by which the articles are engaged by the lateral supporting conveyor means 27 of the upstream log saw machine 21 which makes the articles.

In other words, the conveyor means 14 for receiving the articles 11 comprise transporting means 143 which are adapted to engage the articles at an off-centre lower zone corresponding to the zone 313 where the articles are engaged by the lateral supporting conveyor means 27 of the upstream log saw machine 21 which makes the articles.

In practice, advantageously, the transporting means 143 which are adapted to engage the articles at a corresponding off-centre lower zone 313 have a respective free end which extends at the point, or end, where the articles are released by the lateral supporting conveyor means 27 of the upstream log saw machine 21 which makes the articles.

According to another aspect, first and second transporting means 141, 143 are provided which are adapted to engage the articles 11 at opposite off-centre lower zones, respectively at the side 213 opposite that where the articles are engaged by the lateral supporting conveyor means 27 of the upstream log saw machine 21 and at the side 313 corresponding to that where the articles are engaged by the selfsame lateral supporting conveyor means 27 of the upstream log saw machine 21.

More specifically, the transporting means 141 which are adapted to engage the articles 11 at an off-centre lower, opposite zone extend to a height lower than that of the lateral supporting conveyor means 27 of the log saw machine upstream.

Similarly, the transporting means 143 which are adapted to engage the articles 11 at an off-centre lower zone on the same side as that by which they are engaged by the lateral supporting conveyor means 27 extend to a height lower than that of the selfsame lateral supporting conveyor means 27 of the log saw machine 21 upstream and/or to the same height as the transporting means 141 which are adapted to engage the articles 11 at an off-centre lower, opposite zone.

As illustrated, the transporting means 141 which are adapted to engage the articles 11 at an off-centre lower, opposite zone extend longitudinally beyond the free end of the transporting means 143 which are adapted to engage the articles at a corresponding off-centre lower zone.

Further, the transporting means 141 and 143 run parallel to each other. Advantageously, the transporting means 142 which engage the lower central edge of the articles 11 extend between the transporting means 141 which engage the articles 11 at an off-centre lower, opposite zone and the transporting means 143 which engage the articles at an off-centre lower zone on the same side as that by which they are engaged by the machine upstream.

Advantageously, the transporting means 141 which are adapted to engage the articles at an off-centre lower, opposite zone and the transporting means 143 which are adapted to engage the articles at a corresponding off-centre lower zone extend longitudinally, in particular rearwardly, beyond the free end of the transporting means 142 for centrally engaging the bottom of the articles.

Advantageously, the respective transporting means 141 and/or 143 which are adapted to engage the articles 11 at an off-centre lower zone are in the form of a respective endless, elongate, or cable-like, element.

The respective endless, elongate, or cable-like, element 141 and/or 143 is supported by a respective frame or elongate arm, in particular longitudinally elongate, denoted by the respective reference numeral 145, 147, which advantageously rotatably supports respective pulleys around which the cable-like element 141 and/or 143 move.

As illustrated, the frame 145 which supports the endless elongate element 141 is longer than the frame 147 which supports the endless cable-like elongate element 143.

In practice, the pulleys around which the respective endless cable-like elongate elements 141 and 143 move extend rotatably in cantilever fashion from the respective supporting elongate frame, or arm, 145, 147, and, in particular, are positioned on one flank thereof.

As illustrated, each endless cable-like elongate element 141, 143 is supported on a respective elongate frame or arm 145, 147, which extends in cantilever fashion rearwardly, that is, towards the log saw machine upstream.

As illustrated, the transporting belt 142 defining the transporting means for centrally engaging the bottom of the articles 11 is supported on respective rotating rollers, in particular also supported rotatably by a respective elongate frame, or arm, 149.

Advantageously, and preferably, there are provided drive means 41 for the off-centre engagement conveyor means 141, 143 and drive means 42 for the transporting means 142 for centrally engaging the articles 11.

It is thus advantageously possible to drive the off-centre engagement conveyor means 141, 143, which first receive the articles from the log saw machine 21 upstream, separately from, and independently of, the transporting or conveying and central engagement means 142 following them, so that it is possible, if necessary, to drive the latter at a different feed speed, in particular, a higher feed speed, in order to increase the longitudinal spacing between the articles 11 from one log and the articles 11 from the next log arriving near the transfer end of the movable diverting means 16 and thereby facilitating or allowing the selfsame movable diverting means 16 to perform a diverting or switching action, that is to say, allowing the movable diverting means 16 to be positioned at the respective upper or lower downstream conveyor means 31, 33.

In practice, the drive means for the off-centre engagement transporting means comprise a respective first drive motor 41.

Also, the drive means for the transporting means 142 for centrally engaging the articles 11 comprise a respective second drive motor 42.

Advantageously, the movable conveyor means 16 for diverting the articles comprise a respective rotatable transporting belt which supports the central underside portion of the articles.

Advantageously, the transporting means 142 for centrally engaging the articles and forming part of the receiving conveyor means and the transporting means 16 forming part of the movable conveyor means are defined by a single, shared conveyor belt driven by the same motor 42.

Thus, the movable conveyor means 16 for diverting the articles move at the same speed as the transporting means 142 for centrally engaging the articles and forming part of the article receiving conveyor means 14.

Advantageously, the control means of the apparatus, in particular the same means which control the conveying installation, drive the respective first drive means 41 for the off-centre engagement transporting means 141, 143 and the respective second drive means 42 for the central engagement transporting means 142, 16, in coordination with each other, in particular in such a way that the articles 11 moving thereon are fed at the same speed.

Also, in particular when it is necessary to increase the longitudinal distance between successive trains or groups of articles, in particular between trains of articles obtained from successive logs, the control means of the conveying apparatus drive the respective first drive means 41 for the off-centre engagement transporting means 141, 143 and the respective second drive means 42 for the central engagement transporting means 142, 16, in such a way as to feed the articles on the central engagement transporting means 142, 16 at a higher speed than those on the off-centre engagement transporting means 141, 143 which receive the articles from the log saw machine upstream.

The reference numeral 43 denotes a drive motor to produce the movement by which the movable means 16 for diverting the product flow are switched over. The reference numeral 44, on the other hand, denotes a respective drive motor to produce the movement by which the waste or offcuts 110 are moved away, as will become clearer as this description continues.

In another embodiment, however, not illustrated in the accompanying drawings, the respective transporting means 141, 142 and/or 143 might be driven by a single drive, in particular by a respective single motor.

Thus, the conveyor means 14 for receiving the articles comprise a plurality of parallel conveyor lines, each defined by respective transporting means 141, 142, 143.

Advantageously, the conveyor means 14 for receiving the articles, that is, the transporting means 141, 143, are driven at the same article feed speed as the conveyor means of the machine 21 upstream.

Further advantageously, the movable switching conveyor means 16 of the apparatus move into position at the first and second downstream conveyor means 31, 33 in the interval of time between consecutive trains of articles arriving at the transfer end of the selfsame movable switching conveyor means 16, in particular making use of the space between trains of articles obtained from successive logs.

More specifically, lateral guides for centering the articles on the transporting belts 142, 16 are provided at the sides of the transporting belts themselves.

Advantageously, the off-centre engagement transporting means 141, 143 are adapted to engage only a zone between the respective outer lateral edge 213, 313 of the product and the central bottom edge 113 of the product.

Also, the off-centre engagement transporting means 141, 143 extend rearwardly beyond the transporting means 142 for centrally engaging the articles.

The central engagement transporting means 142 have a respective downstream end for passing the articles to the movable conveyor means 16.

As illustrated in FIG. 7A, the transporting means 142 for centrally engaging the bottom of the articles are adapted to engage the central bottom edge of the article or roll 11.

As mentioned above, the articles, or rolls 11 each have a respective longitudinal axis and are fed along the conveyor means with the longitudinal axis directed along the direction of feed.

Advantageously, the apparatus of the invention comprises means 50 for moving away the waste or offcuts 110.

The means 50 for moving away the waste or offcuts 110 extend under the transporting means 141 which are adapted to engage the articles at a respective off-centre zone.

The means 50 for moving away the waste or offcuts 110 extend under the movable conveyor means 16 for diverting the articles.

The means 50 for moving away the waste or offcuts 110 comprise respective conveyor means 51 transversal to the apparatus.

As illustrated, the transversal conveyor means 51 extend laterally beyond the corresponding lateral flank of the apparatus 10.

More specifically, the transversal conveyor means are designed to collect products from a plurality of conveyor lines of the apparatus, in particular from all the conveyor lines of the apparatus, and are in the form of a corresponding conveyor belt 51 which can be driven to convey the waste or offcuts towards, and in particular beyond, a respective lateral flank of the apparatus 10.

The conveyor means 51 transversal to the apparatus extend at, in particular under, the movable conveyor means 16, in particular at an upstream end of the movable conveyor means 16.

The means 50 for moving away the waste or offcuts 110 also comprise respective longitudinal conveyor means 52 which, in particular, extend longitudinally at the transporting means 141 which are adapted to engage the articles 11 at an off-centre lower zone.

The longitudinal conveyor means 52 are in the form of a respective wide conveyor belt designed to receive the waste or offcuts 110 from a plurality of conveyor lines of the apparatus.

The longitudinal conveyor means 52 are designed to transfer the waste or offcuts 110 to the transversal conveyor means 51.

In practice, the longitudinal conveyor means 52 have an upstream end, substantially aligned vertically with the end of the off-centre engagement conveyor means 141, and a downstream end for transferring the articles to the transversal conveyor means 51.

As illustrated, the longitudinal conveyor belt 52 extends from a lowered position, upstream, to a raised position, downstream, for transferring the waste or offcuts 110 by gravity to the transversal conveyor means 51.

The invention described is susceptible of industrial application. It would be obvious to one skilled in the art that several changes and modifications can be made to the invention without departing from the spirit and scope of the invention, described in depth above. Also, further preferred embodiments of the invention comprising one or more of the features described herein can easily be imagined. It will also be understood that all the details of the invention may be substituted for technically equivalent elements.

The invention claimed is:

1. An apparatus for conveying paper articles towards corresponding points of use, the articles defined by paper rolls of toilet paper or of paper towels, the apparatus being located between an upstream saw machine for cutting the articles from a respective elongate element or log, and at least corresponding first and second conveying systems configured to convey the articles towards corresponding downstream points of use the apparatus being configured to receive the articles from the upstream machine from a respective end conveyor system which is configured to advance the articles while supporting or engaging the articles on a respective lateral flank, the apparatus comprising:
- a supporting frame for a receiving conveyor system that receives the articles from the upstream machine which makes the articles and for a movable conveyor system that is movable and configured to pass the articles respectively at least to the first conveying system or the second conveying system to convey the articles downstream,
- wherein the receiving conveyor system comprises a first transporting system configured to engage the articles at an off-center lower zone which is laterally opposite a lateral engagement zone where the articles are engaged by the lateral supporting end conveyor system of the upstream machine which makes the articles, the first transporting system is an endless elongate cable-like element.

2. The apparatus according to claim 1, wherein the first transporting system which engages the laterally opposite off-center lower zone of the articles extends alongside the lateral supporting end conveyor system of the upstream machine which makes the articles.

3. The apparatus according to claim 1, wherein the receiving conveyor system which receives the articles comprises a second transporting system configured to centrally engage the articles and which receives the articles resting thereon.

4. The apparatus according to claim 3, wherein the second transporting system configured to centrally engage the articles extends alongside the off-center and opposite engagement first transporting system.

5. The apparatus according to claim 3, wherein the receiving conveyor system configured to receive the articles comprises a third transporting system configured to engage the articles at an off-center lower zone corresponding to where the articles are engaged by the lateral supporting end conveyor system of the upstream machine which makes the articles.

6. The apparatus according to claim 5, wherein the third transporting system configured to engage the articles at the corresponding off-center lower zone has a respective free end which extends at the point where the articles are released by the lateral supporting end conveyor system of the upstream machine which makes the articles.

7. The apparatus according to claim 5, wherein the first transporting system which is configured to engage the articles at the off-center lower, opposite zone extends longitudinally beyond a free end of the third transporting system which is configured to engage the articles at a corresponding off-center lower zone.

8. The apparatus according to claim 5, wherein the second transporting system configured to centrally engage the bottom of the articles extends between the first transporting system which is configured to engage the articles at the corresponding off-center lower, opposite zone and the third transporting system which is configured to engage the articles at the corresponding off-center lower zone.

9. The apparatus according to claim 5, wherein the first transporting system which is configured to engage the articles at the off-center lower, opposite zone and/or the third transporting system which are configured to engage the articles at a corresponding off-center lower zone extend longitudinally beyond the free end of the second transporting system configured to centrally engage the bottom of the articles.

10. The apparatus according to claim 5, wherein the off-center engagement first and third transporting systems are configured to engage only a zone between the outer lateral edge and the bottom edge of the article or roll.

11. The apparatus according to claim 5, wherein the off-center engagement first and second transporting systems extend rearwardly towards the upstream machine which makes the articles, beyond the central engagement second transporting system.

12. The apparatus according to claim 5, further comprising a first drive device for the first and third conveyor systems and a second drive device for the second transporting system configured to centrally engage the articles and which receives the articles resting thereon.

13. The apparatus according to claim 12, wherein the first drive device for the off-center engagement first and third transporting systems comprises a respective first drive motor.

14. The apparatus according to claim 12, wherein the second drive device for the second transporting system configured to centrally engage the articles comprises a respective second drive motor.

15. The apparatus according to claim 12, wherein the respective first drive device for the off-center engagement first and third transporting systems and the respective second drive device for the central engagement second transporting system are controlled and coordinated with each other to feed the articles at the same speed.

16. The apparatus according to claim 12, wherein the respective first drive device for the off-center engagement first and third transporting systems and the respective second drive device for the central engagement second transporting system are controlled to feed the articles at different speeds, so that the articles on the central engagement second transporting system are fed at a higher speed than the articles on the off-center engagement first and third transporting systems which receive the articles from the log saw machine upstream, to increase longitudinal spacing between groups or trains of consecutive articles.

17. The apparatus according to claim 3, wherein the second transporting system configured to centrally engage the articles is in the form of a drive belt.

18. The apparatus according to claim 17, wherein the drive belt defining the second transporting system configured to centrally engage the articles is supported by respective rotatable sliding rollers.

19. The apparatus according to claim 3, wherein the second transporting system of the receiving conveyor system, configured to centrally engage the articles, and the movable conveyor system are in the form of a single, shared transporting belt.

20. The apparatus according to claim 3, wherein the second transporting system for centrally engaging the bottom of the articles is configured to engage the bottom edge of the article or roll.

21. The apparatus according to claim 3, wherein the central engagement second transporting system has a respective end for passing the articles to the movable conveyor system.

22. The apparatus according to claim 1, further comprising the first transporting system and another transporting system, both of which are configured to engage the articles at opposite off-center lower zones, respectively, at the side opposite where the articles are engaged by the lateral supporting end conveyor system of the upstream machine and at the side corresponding to where the articles are engaged by the lateral supporting end conveyor system of the upstream machine (21).

23. The apparatus according to claim 22, wherein the respective first transporting system and the other transporting system which are configured to engage the articles at the off-center lower zone include endless elongate cable-like elements.

24. The apparatus according to claim 23, wherein the endless elongate cable-like elements are supported by a respective frame or elongate arm extending rearwardly in cantilever fashion.

25. The apparatus according to claim 1, wherein the first transporting system which is configured to engage the articles at the off-center lower, opposite zone extends to a height lower than that of the lateral supporting end conveyor system of the upstream machine.

26. The apparatus according to claim 1, wherein the movable conveyor system configured to divert the articles comprises a respective rotatable transporting belt which supports the central underside portion of the articles.

27. The apparatus according to claim 1, wherein the movable conveyor system moves into position at the first and second downstream conveyor systems in the interval of time between consecutive trains of articles, making use of the space between trains of articles obtained from successive logs.

28. The apparatus according to claim 1, wherein the movable conveyor system configured to divert the flow of articles comprises an upstream fixed end where the articles are passed on by the receiving conveyor system which receives the articles, and is movable, rotatable about a respective transverse axis, to move the free end vertically, at least between the first and second downstream conveyor systems which are located one above the other.

29. The apparatus according to claim 1, wherein the articles, or rolls, each have a respective longitudinal axis and are fed with the longitudinal axis directed along the direction of feed.

30. The apparatus according to claim 1, wherein the articles, or rolls, of each train of rolls are cut from a respective log.

31. The apparatus according to claim 1, further comprising a plurality of conveyor lines running side by side, parallel to each other.

32. The apparatus according to claim 1, further comprising a waste removing system configured to move away the waste or offcuts.

33. The apparatus according to claim 32, wherein the waste removing system configured to move away the waste or offcuts extends under the first transporting system which is configured to engage the articles at the respective off-center zone.

34. The apparatus according to claim 32, wherein the waste removing system configured to move away the waste or offcuts extends under the movable conveyor system configured to divert the articles.

35. The apparatus according to claim 32, wherein the waste removing system configured to move away the waste or offcuts comprises a respective waste conveyor system transverse to the apparatus in the form of a corresponding transporting belt which conveys the waste or offcuts towards one lateral flank of the apparatus.

36. The apparatus according to claim 35, wherein the waste conveyor system transverse to the apparatus extends at and under the movable conveyor system.

37. The apparatus according to claim 36, wherein the waste removing system configured to move away the waste or offcuts comprises respective a longitudinal conveyor system which extends longitudinally at the first transporting system which is configured to engage the articles at the off-center lower zone and which is configured to transfer the waste or offcuts to the transversal waste conveyor system.

* * * * *